United States Patent
Burger et al.

(10) Patent No.: US 7,676,451 B2
(45) Date of Patent: Mar. 9, 2010

(54) SELECTIVE DATABASE STATISTICS RECOLLECTION

(75) Inventors: Louis Burger, Escondido, CA (US); Frank Roderic Vandervort, Ramona, CA (US)

(73) Assignee: Teradata US, Inc., Miamisburg, OH (US)

(*) Notice: Subject to any disclaimer, the term of this patent is extended or adjusted under 35 U.S.C. 154(b) by 293 days.

(21) Appl. No.: 11/743,897

(22) Filed: May 3, 2007

(65) Prior Publication Data

US 2008/0275840 A1    Nov. 6, 2008

(51) Int. Cl.
*G06F 7/00* (2006.01)
*G06F 17/00* (2006.01)
*G06F 17/30* (2006.01)

(52) U.S. Cl. .......................... 707/2; 717/109
(58) Field of Classification Search .............. None
See application file for complete search history.

(56) References Cited

U.S. PATENT DOCUMENTS

| 5,790,427 | A | * | 8/1998 | Greer et al. | 702/127 |
| 6,360,214 | B1 | | 3/2002 | Ellis | |
| 6,366,901 | B1 | | 4/2002 | Ellis | |
| 6,847,978 | B2 | * | 1/2005 | Ellis et al. | 707/102 |
| 6,959,429 | B1 | * | 10/2005 | Hatcher et al. | 717/109 |
| 7,430,562 | B1 | * | 9/2008 | Bedell et al. | 707/102 |
| 2007/0118690 | A1 | * | 5/2007 | Wake | 711/114 |

* cited by examiner

*Primary Examiner*—Khanh B Pham
*Assistant Examiner*—Azam Cheema
(74) *Attorney, Agent, or Firm*—Schwegman, Lundberg, Woessner

(57) ABSTRACT

The subject mater herein relates to database management and, more particularly, to selective database statistics recollection. Various embodiments provide one or more of system, methods, and software that identify database column and index states when statistics become stale to a point where query execution plans against respective columns and indexes fail to be efficient. These and other embodiments provide a way to update column and index statistics only when the statistics are determined to be stale. As a result, adverse database performance as a result of needless updating of database statistics is mitigated.

18 Claims, 5 Drawing Sheets

| ITEM | TYPE | ROW COUNT | LAST UPDATE | MODIFIED COUNT | STALE FLAG | ... |
|---|---|---|---|---|---|---|
| PERS_NO | COL | 150250 | 4/1/2008 | 0 | F | ... |
| PERS_NO-ACCT_NO | INDEX | 150250 | 4/1/2008 | 30049 | F | ... |
| ACCT_NO | COL | 150250 | 4/1/2008 | 32512 | T | ... |
| TRANS_ID | COL | 1002543 | 1/31/2008 | 51523 | T | ... |
| . | . | . | . | . | . | . |
| . | . | . | . | . | . | . |
| . | . | . | . | . | . | . |

SELECTIVE DATABASE STATISTICS RECOLLECTION

TECHNICAL FIELD

The subject mater herein relates to database management and, more particularly, to selective database statistics recollection.

BACKGROUND INFORMATION

Query optimizers in relational database management systems rely on statistics to accurately choose an efficient execution plan. Users are responsible for identifying which columns and indexes on which to collect statistics and then periodically recollecting these statistics to refresh them. Over time, statistics often become stale as the corresponding data is subjected to updates. The process of recollecting statistics usually requires scanning and sorting all of the indexed or column data and is thus resource intensive, especially for large tables. As a result, users wish to limit recollections to only when necessary, namely when the data demographics have changed significantly. Unfortunately, it is often difficult for users to manually determine the need for recollections. This is particularly true in the case of periodic batch load operations that can be done as frequently as once per day.

Each batch load operation (or a series of them) has the potential of significantly altering data demographics and hence may require a statistics recollection after it completes. Because most users aren't able to determine the impact to demographics, they either resort to recollecting after every load operation, some of which are probably unnecessary, or they skip recollections altogether which then results in stale statistics.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
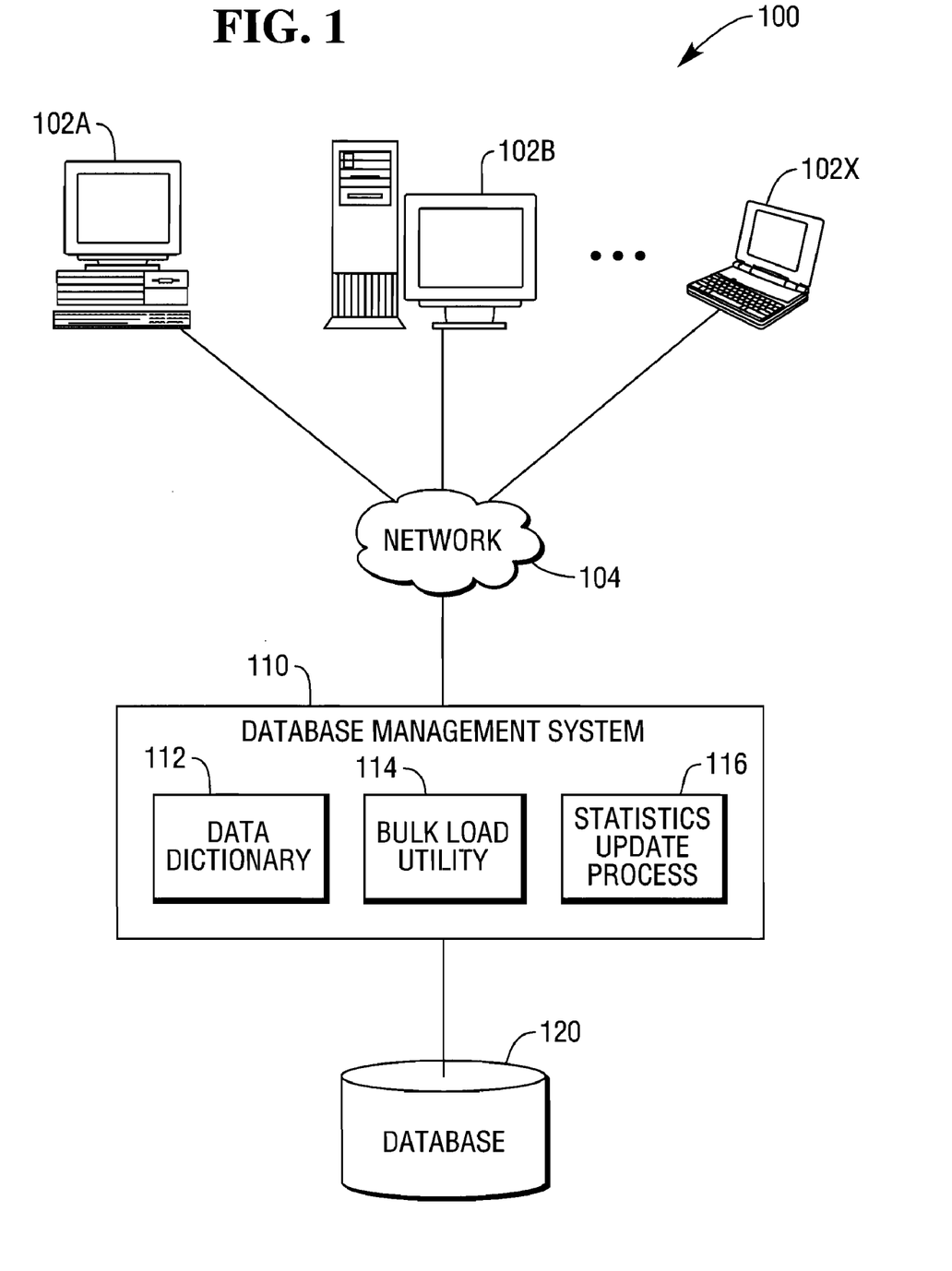
FIG. 1 is a logical block diagram of a system according to an example embodiment.

FIG. 1 is a logical block diagram of a system 100 according to an example embodiment. The system 100 includes any number of clients 102A, 102B, ... 102X interconnected via a network 104. Also connected to the network 104 is a database management system 110.

The clients 102A, 102B, ... 102X include general purpose computing devices such as desktop and laptop computers, personal digital assistants, and other devices. The clients 102A, 102B, ... 102X may also include one or more server computers. Applications that execute on the clients 102A, 102B, ... 102X access data managed by the database management system 110.

The database management system 110 may execute on one or more of the clients 102A, 102B, ... 102X or a special purpose computing device interconnected to the network 104. The database management system 110 manages data stored in a database 120. The database 120 may be located on the same computing device as the database management system 110 or one or more other computing devices interconnected via the network 104 or other network.

The database management system 110 manages data stored in the database 120. In some embodiments, the database management system 110 is a relational database management system. Management of the data is typically performed by various processes within the database management system 110. Some of these processes operate to maintain a data dictionary 112 that is utilized by other processes of the database management system 110.

Figure 2:
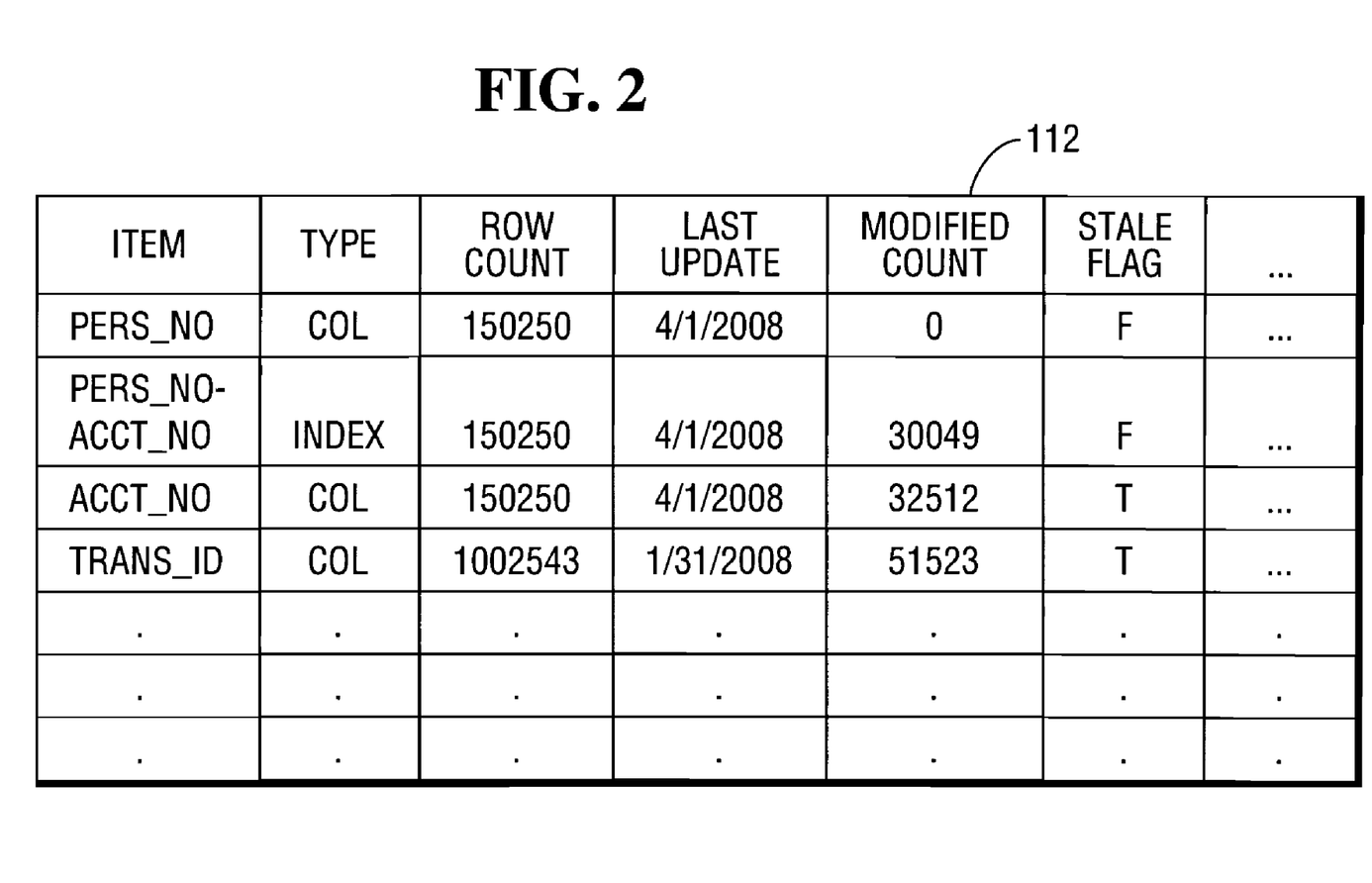
FIG. 2 is an illustration of a portion of a data dictionary holding meta data describing columns and indexes maintained by a database management system according to an example embodiment.

In some embodiments, the data dictionary 112 is a file, table, or other data structure, that defines the basic organization of a database 120. The data dictionary 112 also typically includes a list of all files, tables, or other data structures in the database 120, the number of records in each data structure, and the names and types of each field in each data structure. The data dictionary does not contain any actual data from the database 120. Rather, the data dictionary 112 maintains bookkeeping information, typically in the form of metadata, that is used by processes of the database management system 110 in managing the database 120. The metadata of the data dictionary 112 commonly includes statistics that describe the data including statistics that describe distributions of data and other statistics that are used to generate execution plans when users or processes access data within the database 120. Statistics may be collected and maintained for many different portions of the database 120 including indexes, tables, and specific columns within tables. FIG. 2 provides an example illustration of a portion of the data dictionary 112 of some embodiments.

The processes of the database management system 110 may also include a bulk load utility 114 and a statistics update process 116. The bulk load utility 114 is a utility that operates to facilitate loading of data, typically in large volumes, to the database 120. The statistics update process 116 operates to update statistics within the data dictionary 112.

When users of clients 102A, 102B, . . . 102X or users of or processes within the database management system 110 submit queries to the database management system 110, the queries are processed by a query optimizer. A query optimizer typically utilizes statistics from the data dictionary 112 to choose an efficient execution plan for servicing each query. The query optimizer identifies an efficient execution plan based on the statistics. However, if the statistics are not current, the query optimizer is unlikely to choose an efficient execution plan. However, updating statistics within the database management system 110 typically utilizes a significant amount of database management system 110 resources over extended periods.

In some embodiments, the data dictionary 112 includes further metadata that provides information on the status of statistics within the data dictionary 112. In some embodiments, this further metadata includes one or more of a stale flag and a modified count. The stale flag and modified count may be maintained for columns and indexes for which statistics are maintained with the data dictionary 112. The stale flag indicates if the statistics for a respective column or index are out of date, or stated more simply, stale. The modified count is a count of inserted, updated, or deleted values of in a column or index. The modified count may be used by one or more processes to determine when the stale flag should be set to indicate the statistics of the respective column or index are out of date.

In some embodiments, database management system 110 administrators cause statistics to be collected on a specified column or index of a table using the Structured Query Language ("SQL") command syntax "COLLECT STATISTICS . . . " as shown below. This command, in typical embodiments, will cause the statistics update process 116 to scan and sort the underlying data to generate the frequency for each distinct value which in turn will be used to build an equi-height histogram that is stored in the data dictionary.

```
/* Collecting on a specific column or index */
COLLECT STATISTICS ON <table_name> <column_or_index>;
```

Collected statistics may then be recollected by omitting a specific column or index in the syntax:

```
/* Recollect on all previously specified columns and indexes */
COLLECT STATISTICS ON <table_name>;
```

This statement, when submitted by a database administrator or by a scheduled automated process, causes the statistics update process 116 to determine which columns and indexes currently have statistics and then unconditionally performs a recollection on each of them.

The database management system 110 also includes a command which may be submitted to cause the statistics update process 116 to recollect statistics only on those columns and indexes whose data demographics have changed significantly enough since the last recollection to cause the statistics to be considered stale. An example of such a command is:

```
/* Recollecting on only those columns or indexes that need refreshing */
COLLECT STATISTICS ON <table_name> [AS NEEDED];
```

In some embodiments, statistics for a given column or index are stored in the data dictionary 112 row that contains the column or index definition. To support the "AS NEEDED" option, a Boolean column exists in the data dictionary 112 row to serve as a recollection flag. See FIG. 2, "STALE FLAG" column. When statistics are initially collected on a column or index, this flag is initialized to false. In some embodiments, after the completion of one or more load operations, the system will set this flag to true if the load process determines that data demographics have likely changed. When a COLLECT STATISTICS command with the AS NEEDED clause is issued, the statistics update process will perform recollections on only those columns or indexes whose stale flag has been set to true. If statistics are recollected, the flag is then reset back to false.

The stale flag may also be set to true after a certain number of changes to values of a column or values involved in an index are inserted, modified, or deleted. In some such embodiments, the database management system 110 includes a process that monitors updates to values involved in column or indexes for which statistics are maintained. In other embodiments, a data manipulation tool or database management system 110 utility that is used to manipulate the data monitors the data and sets the stale flag to true when enough of such updates are made to affect the data demographics enough to warrant a statistics update.

In some embodiments, the data dictionary 112 row that contains the column or index definition of a data item for which statistics are maintained includes a further column. This further column is a "modified count" column. See FIG. 2, "MODIFIED COUNT" column. The modified count column is incremented by a number of inserted, modified, and deleted values involved in the column or index represented by the data dictionary 112 row. In some of these embodiments, when the modified count reaches a threshold, the stale flag is set to true. The threshold in such embodiments may be when the modified count value reaches a certain percentage, such as five percent, of all values in a column. The percentage, in some such embodiments, is set to match the size of histograms maintained in the data dictionary 112 for a representative column or index. In other embodiments, the threshold is initially set to a default value, such as five or ten percent, and may later be changed by an administrator. In some instances, an administrator may choose to increase or decrease the threshold percentage based on system performance experience and, perhaps, even experience with a particular column or index.

In some embodiments, during the course of executing operations, the database management system 110 applies the following rules to determine if the stale flag should be set to true:

1. Column or indexed data that is subjected to a significant amount of modifications relative to the overall size of the table. In some embodiments, by default, this rule is true when 20% or more of the total rows in an affected table have had their values changed for a particular column or index.
2. Column or indexed data that has new data inserted that forms a brand new range of values as represented in the statistics histogram. If a sufficient number of new values are inserted such that a brand new histogram interval would be created, it is assumed that statistics should be recollected.

The intent of the first rule is to identify those cases where data in a column or index has undergone a very large number of changes in the form of updates, deletes, or inserts. The rule may be implemented such that the rule can take into account the cumulative changes of multiple operations, such as load operations. The intent of the second rule is to identify those cases where a brand new range of values are inserted into a column or index. A typical example is in the case of date related data where periodic load operations insert new date ranges. Such data related data, in some embodiments, may be monthly billing data, periodic account statement data, and the like.

In some embodiments, these two rules may be implemented in conjunction with bulk load utility 114 and INSERT-SELECT statements. An example of a bulk load utility is MultiLoad which is the primary bulk load utility in the Teradata database management system available from Teradata which is a division of NCR of Dayton, Ohio. Bulk load utilities are generally capable of inserting, updating, or deleting large numbers of rows in a non-empty database table in a block-at-a-time fashion. The INSERT-SELECT statement is a common method in standard SQL for inserting large numbers of rows from another table.

In some embodiments, the first rule utilizes the MODIFIED COUNT column shown in FIG. 2 which serves as a counter for the number of rows modified by load operations and other operations since the last collection of statistics. In some embodiments, logic is included in the bulk load utility 114 to update this modified count column at the end of its processing and may also set the stale flag to true if the value of the modified count column exceeds this rule's defined threshold (e.g., 20% of total rows).

In some embodiments where the modified count column is updated when INSERT-SELECT statements are issued, the database management system 110 utilizes functionality that is part of most query optimizers. Query optimizers typically estimate the number of retrieved rows from a SELECT as part of its normal processing. As part of the INSERT-SELECT statement processing, these embodiments include incrementing the modified count counter in the data dictionary 112 for every column or index in the target table of an INSERT-SELECT statement. The INSERT-SELECT statement process may also include setting the stale flag to true if the threshold is met.

In some embodiments, including implementations of the second rule, the bulk load utility 114 collects rows to be inserted in a temporary table of the database 120. Query optimizer statistics are then collected on the temporary table containing new rows to be inserted. Similarly, rows of INSERT-SELECT statements may also be collected in a temporary table prior to insertion to a target table and statistics collected. In both instances, separate collections of statistics may be made on each target table column or index that currently has statistics in the data dictionary 112.

The recollection rule for a given column, or group of indexed columns, in some embodiments, is considered to be true whenever the statistics histogram generated from the work table has (a) one or more contiguous intervals whose boundary values are outside of any intervals of the target table's current statistics and (b) the combined number of values in these intervals is greater than or equal to the interval size N of the target base table.

In some database management systems, such as Teradata as mentioned above, the histograms of the statistics are equi-height, meaning their interval boundaries are defined with varying widths such that each interval contains approximately the same number of rows which are referred to as the interval size of 'N'. As a result, intervals of the temporary table's histogram are examined and a determination is made if one or more of the temporary table's contiguous intervals would form a brand new interval in the target table's histogram if statistics were in fact recollected. If so, the stale flag in the data dictionary 112 row is set to true.

Note that the maximum number of intervals in the database management system 110 may vary from embodiment to embodiment. If the maximum number of intervals of a particular embodiment is 200, each interval describes approximately 0.5% of the overall data. Hence, it is possible for this second rule to evaluate to true in cases where only a small amount of data, relative to the target table, is inserted. For example, if a given base table column contains 156 weeks (3 years) worth of data and each week contains approximately the same number of rows, then loading data for one additional week can form a new interval in the target table ($1/156$ is greater than $1/200$).

Because the size of worktables and spool files will typically be much smaller than the target table, collecting statistics on them is typically much less resource intensive than performing a collection on the target table. In some embodiments, to avoid any unnecessary collections on large work tables, the first rule is evaluated prior to the second rule and if true, the second rule is skipped. For example, if a given operation, along with one or more prior operations, involves more than 20% of the total number of existing rows, the first rule will evaluate to true making it unnecessary to collect statistics on the work table.

In some embodiments, the statistics update process 116 is operative to update column and index statistics for which the stale flag column value in the data dictionary 112 is set to true. In some embodiments, the statistics update process executes upon receipt of a process call to update the statistics. After updating the statistics, the statistics update process sets the stale flag column to false and reset the modified data counter column value to zero for each column and index for which the statistics were successfully updated.

Figure 3:
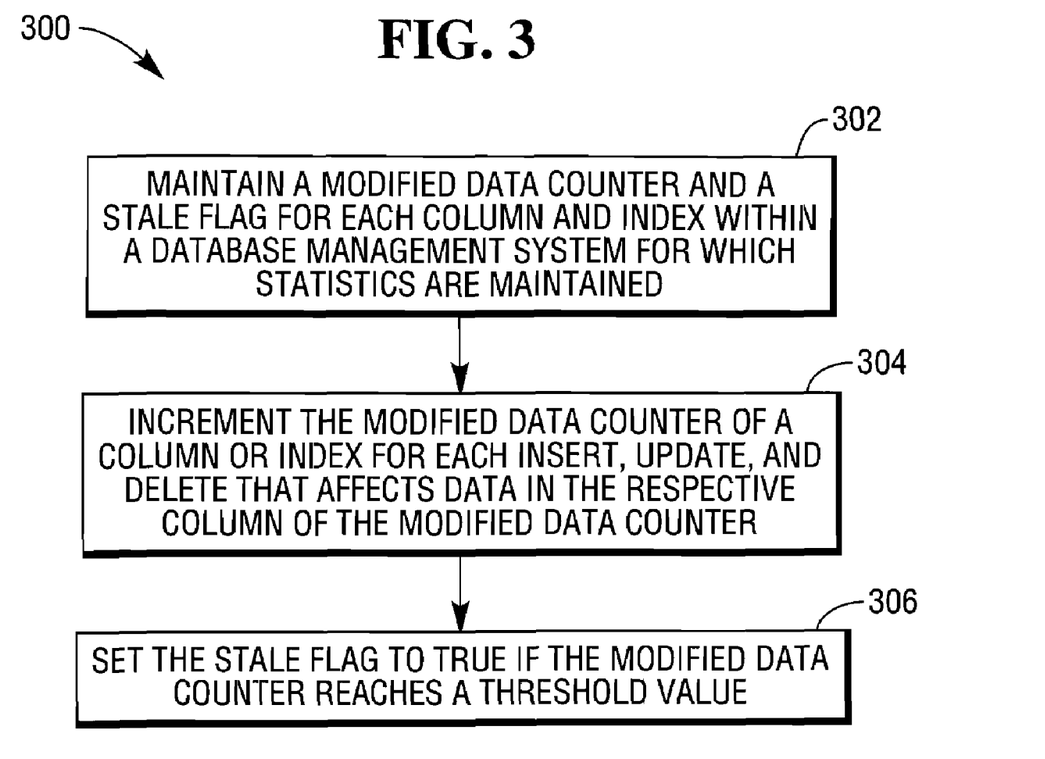
FIG. 3 is a block diagram of a method according to an example embodiment.

FIG. 3 is a block diagram of a method 300 according to an example embodiment. The example method 300 is a method of maintaining statistics in a database management system. The example method 300 includes maintaining a modified data counter and a stale flag for each column and index within a database management system for which statistics are maintained 302. The method 300 further includes incrementing the modified data counter of a column or index for each insert, update, and delete that affects data in the respective column of the modified data counter 304 and setting the stale flag to true if the modified data counter reaches a threshold value 306. In some embodiments, the threshold value is a percentage of all rows of data of a table to which the respective column is a member of or a dataset of the respective index.

Figure 4:
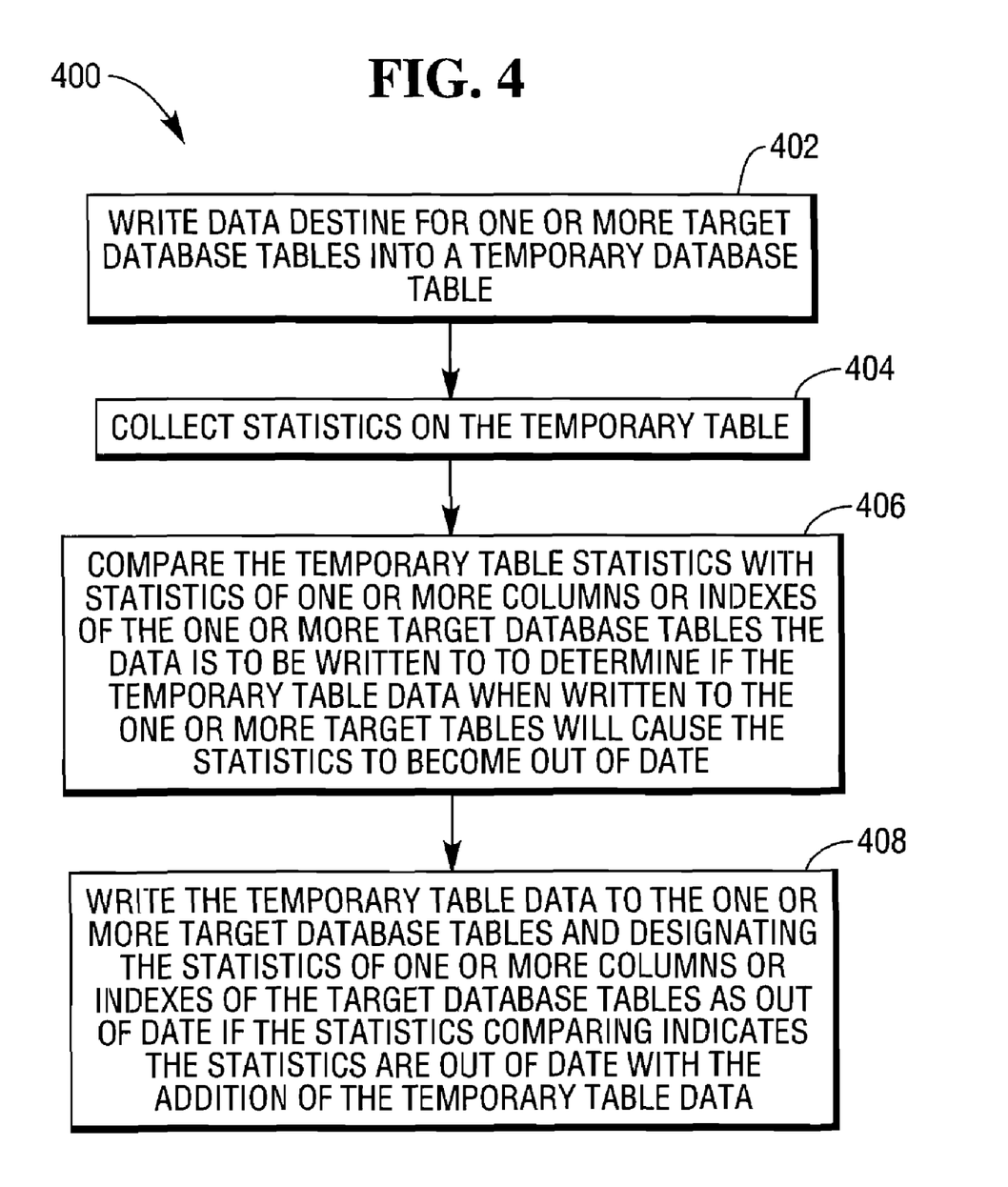
FIG. 4 is a block diagram of a method according to an example embodiment.

FIG. 4 is a block diagram of a method 400 according to an example embodiment. The example method 400 is another method of maintaining statistics in a database management system. Note that some embodiments include both the method 300 of FIG. 3 and the method 400 of FIG. 4. The method 400 includes writing data to be inserted into a target table into a temporary database table 402 and collecting statistics on the temporary table 404. The method 400 further includes comparing the temporary table statistics with statistics of one or more target table columns or indexes the data is to be written to for storage. This comparing is performed to determine if the data in the temporary table, when written to the target table, will cause column or index statistics to become out of date 406. The method 400 further includes writing the temporary table data to the target table of the database and designating the statistics of one or more columns or indexes as out of date if the statistics comparing indicates the database statistics are out of date with the addition of the temporary table data 408. In some such embodiments, the database statistics are out of date when execution plans developed by a database management system to service queries of the database are no longer efficient.

Figure 5:
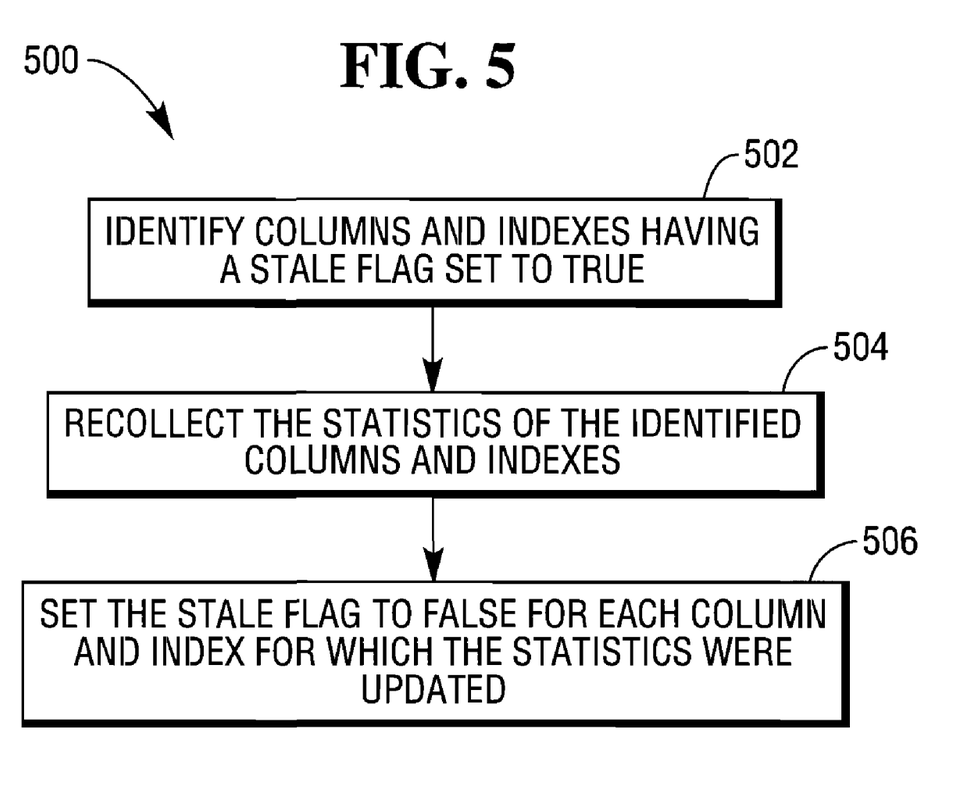
FIG. 5 is a block diagram of a method according to an example embodiment.

FIG. 5 is a block diagram of a method 500 according to an example embodiment. The method 500 is a method of selectively updating data dictionary statistics only when statistics of a column or index are identified as being out of date. The statistics may be determined to be out of date, in various embodiments, by a process implementing one or both of the example method 300 of FIG. 3 and the example method 400 of FIG. 4.

Returning to FIG. 5, in some embodiments, the method 500 includes identifying columns and indexes having a stale flag set to true 502 and recollecting the statistics of the identified columns and indexes 504. The method 500 also includes setting the stale flag to false for each column and index for which the statistics were updated 506. In embodiments including a modified counter column utilized to track a number of column or index values modified, inserted, or deleted, the counter is also set to zero when the statistics are recollected.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A database management system comprising:
a processor;
a computer readable media storing:
a data dictionary including rows of metadata, the metadata of each row to describe one or more of a column of a database table and a set of two or more columns forming an index stored in the database management system, wherein the metadata of at least a subset of the data dictionary rows includes:
a stale flag column implemented in a database that is to be set to true by a process that executes on a machine when the metadata of a row is determined to be out of date by the process; and
instructions defining database management system processes executable by the processor, the database management system processes including a stale flag process executable by the processor to set the stale flag to true when the metadata of a row of metadata is determined to be out of date; and
wherein the stale flag process, when preparing data to be inserted as new rows to one or more tables:
writes the data into temporary table;
collects statistics on each target table column of data in the temporary table that corresponds to a table column and sets of columns forming indexes for which statistics are collected for and stored in the data dictionary; and
sets the stale flag column to true for each column and index for which the temporary table statistics, when compared with statistics of the target column or index, indicate that the target column or index statistics should be updated.

2. The database management system of claim 1, wherein the stale flag process is part of a bulk load utility of the database management system.

3. The database management system of claim 1, wherein each row of the subset of data dictionary rows corresponds to a column or an index managed by the database management system.

4. The system of claim 1, wherein the metadata of the at least a subset of the data dictionary rows further includes:
a modified data counter column implemented in the database that is incremented by the stale flag process when a value of the column of a row or index is modified, deleted, or inserted.

5. The database management system of claim 4, wherein the stale flag process, before committing a transaction, executes on the machine to:
update the modified data counter column value of each affected column or index by adding a number of data items of a column or index modified and a respective current modified data counter column value affected by the transaction; and
set the stale flag column of each data item affected by the transaction to true if the updated modified data column counter of a data item is at least a threshold percentage of a number of rows in a table in which the data item is stored.

6. The database management system of claim 5, wherein the database management system processes further include:
a selective statistics update process executable by the processor to:
update column and index statistics for only those columns and indexes for which the stale flag column is set to true; and
set the stale flag column to false and reset the modified data counter column value to zero for each column and index for which the statistics were successfully updated.

7. The database management system of claim 1, wherein the database management system processes further include:

a selective statistics update process executable by the processor to:
update column and index statistics for only those columns and indexes for which the stale flag column is set to true; and
set the stale flag column to false for each column and index for which the statistics were successfully updated.

8. A method of maintaining statistics in a database management system, the method comprising:
maintaining a modified data counter and a stale flag for each column and index within a data dictionary of a database management system for which statistics are maintained;
incrementing the modified data counter of a column or index for each insert, update, and delete that affects data in the respective column of the modified data counter;
setting the stale flag to true if the modified data counter reaches a threshold value;
storing the stale flag when set to true;
writing data to be inserted into the database management system into a temporary table;
collecting statistics on each target table column of data in the temporary table that corresponds to a table column and sets of columns forming indexes for which statistics are collected for and stored in the data dictionary of the database management system; and
setting the stale flag to true for each column and index for which the temporary table statistics, when compared with statistics of the target column or index, indicate that the target column or index statistics should be updated.

9. The method of claim 8, wherein the threshold value is a percentage of all rows of data of a table to which the respective column is a member of or a dataset of the respective index.

10. The method of claim 8, further comprising:
selectively updating column or index statistics upon receipt of a selective statistics update command by:
identifying columns and indexes having a stale flag set to true;
recollecting the statistics of the identified columns and indexes; and
setting the stale flag to false for each column and index for which the statistics were updated.

11. The method of claim 8, wherein the method is performed by a database bulk load utility.

12. The method of claim 8, wherein the database management system is a relational database management system.

13. The method of claim 8, wherein the column and index statistics are maintained in a data dictionary of the database management system.

14. A computer readable storage medium, with instructions thereon to cause a suitably configured computer system to:
write data into a temporary database table;
collect statistics on the temporary table, the statistics collected on each column in the temporary table that corresponds to a column of a table in a target database and sets of columns in the temporary table corresponding to sets of columns in the target database forming indexes for which statistics are collected for and stored in a data dictionary of the target database;
compare the temporary table statistics with statistics of one or more columns or indexes stored in the data dictionary of the target database the data is to be written to for storage to determine if the temporary table will cause the database statistics stored in the data dictionary to become out of date; and
write the temporary table data to the target database and designate the statistics of one or more columns or indexes stored in the data dictionary of the target database as out of date if the statistics comparing indicates the database statistics stored in the data dictionary are out of date with the addition of the temporary table data.

15. The computer readable storage medium of claim 14, wherein database statistics are out of date when execution plans developed by a database management system to service queries of the database are no longer efficient.

16. The computer readable storage medium of claim 14, with further instructions thereon to cause the computer system to:
selectively update column or index statistics of the database upon receipt of a selective statistics update command by:
recollecting the statistics of the columns and indexes having statistics designated as out of date; and
designated the statistics of each column and index for which the statistics were updated as current.

17. The computer readable storage medium of claim 14, with further instructions thereon to cause the computer system to:
maintain a modified data counter for each column and index within a database management system for which statistics are maintained for;
incrementing the modified data counter of a column or index for each insert, update, and delete that affects data in the respective column of the modified data counter; and
designating the statistics of a column or index as out of date if the modified data counter reaches a threshold value.

18. The computer readable storage medium of claim 17, wherein the threshold value is a percentage of all rows of data of a table to which the respective column is a member of or a dataset of the respective index.

* * * * *